United States Patent [19]
Rossi et al.

[11] Patent Number: 5,639,716
[45] Date of Patent: Jun. 17, 1997

[54] OIL SOLUBLE DISPERSANT ADDITIVES BASED ON 1-BUTENE-α OLEFIN COPOLYMERS

[75] Inventors: Albert Rossi, Warren, N.J.; Jacob L. Emert, Brooklyn, N.Y.; Warren A. Thaler, Flemington, N.J.

[73] Assignee: Exxon Chemical Patents Inc., Linden, N.J.

[21] Appl. No.: 257,614

[22] Filed: Jun. 9, 1994

[51] Int. Cl.⁶ .............................. C10M 145/00
[52] U.S. Cl. .................. 508/189; 508/190; 508/192; 508/194; 508/198; 508/290; 508/293; 508/507; 508/514; 508/528; 525/436; 525/444
[58] Field of Search ................ 252/50, 51.5 A, 252/56 R; 508/189, 190, 192, 194, 198, 290, 293, 507, 514, 528; 525/436, 444

[56] References Cited

U.S. PATENT DOCUMENTS

| | | | |
|---|---|---|---|
| 4,234,435 | 11/1980 | Meinhardt et al. | 252/51.5 |
| 4,658,078 | 4/1987 | Slaugh et al. | 585/512 |
| 4,707,285 | 11/1987 | Brewster et al. | 252/51.5 A |
| 4,867,890 | 9/1989 | Colclough et al. | 252/32.7 A |
| 4,925,579 | 5/1990 | Stemke | 252/51.5 A |
| 5,068,490 | 11/1991 | Eaton | 585/525 |
| 5,087,788 | 2/1992 | Feng-Jung Wu | 585/512 |
| 5,169,924 | 12/1992 | Asanuma et al. | 526/348 |
| 5,229,022 | 7/1993 | Song et al. | 252/56 R |
| 5,266,223 | 11/1993 | Song et al. | 252/51.5 A |
| 5,275,747 | 1/1994 | Gutierrez et al. | 252/51 |
| 5,277,833 | 1/1994 | Song et al. | 252/56 R |
| 5,328,624 | 7/1994 | Chung | 252/51.5 A |
| 5,433,875 | 7/1995 | Rollin et al. | 252/51.5 R |

FOREIGN PATENT DOCUMENTS

| | | | |
|---|---|---|---|
| 0208560 | 1/1987 | European Pat. Off. | C10M 129/93 |
| 0355895A2 | 2/1990 | European Pat. Off. | |
| 0441548 | 8/1991 | European Pat. Off. | C10L 1/18 |
| 0490454 | 6/1992 | European Pat. Off. | |
| 4030399 | 2/1992 | Germany | C07C 11/02 |
| 63-37102 | 2/1988 | Japan . | |
| 63-57615 | 3/1988 | Japan | C08F 4/64 |
| H1-132605 | 5/1989 | Japan . | |
| WO90/01503 | 2/1990 | WIPO | C08F 210/02 |
| WO94/29413 | 12/1994 | WIPO | C10M 159/16 |

*Primary Examiner*—Margaret Medley
*Attorney, Agent, or Firm*—K. R. Walton

[57] ABSTRACT

Oil-soluble dispersant additives are disclosed. The additives comprise the reaction product of a functionalized 1-butene copolymer and at least one nucleophilic reactant selected from amines, amino alcohols, alcohols, and reactive metal compounds. The functionalized copolymer has within its structure at least one acyl functional group selected from the group consisting of $C_4$ to $C_{10}$ dicarboxylic acids and derivatives thereof and $C_3$ to $C_{10}$ monocarboxylic acids and derivatives thereof. The 1-butene copolymer is derived from 1-butene and at least one other α-olefin of formula $CH_2=CHR'$, wherein R' is methyl or a $C_3$ to $C_{12}$ linear or branched alkyl group. The copolymer has a number average molecular weight of at least about 700, a molecular weight distribution of less than 5, and ethenylidene groups terminating at least about 30% of all polymer chains. The dispersant additives are useful in oleaginous compositions including lubricating oil compositions and concentrates and fuel compositions.

17 Claims, 4 Drawing Sheets

OIL SOLUBLE DISPERSANT ADDITIVES BASED ON 1-BUTENE-α OLEFIN COPOLYMERS

FIELD OF THE INVENTION

The invention relates to oil-soluble dispersant additives useful in oleaginous compositions, including lubricating oil compositions and fuel compositions. The invention also relates to concentrates containing the dispersant additives.

BACKGROUND OF THE INVENTION

Hydrocarbon oil compositions typically comprise a mixture of at least one hydrocarbon base oil and one or more additives, where each additive is employed for the purpose of improving the performance and properties of the base oil in its intended application; e.g., as a lubricating oil, heating oil, diesel oil, middle distillate fuel oil, and so forth. Lubricating oil compositions face rather stringent viscosity requirements, as set, for example, by SAE specifications. Such compositions must meet a minimum viscosity requirement at high temperature (at least about 100° C.) and a maximum viscosity requirement at low temperature (about −5° to −30° C.). The minimum viscosity requirement at high temperature is intended to prevent the oil from thinning during engine operation to the point at which excessive engine wear and increased oil consumption would result. The maximum viscosity requirement at low temperature facilitates engine start-up in cold weather and also ensures the cold oil has sufficient pumpability and flowability to avoid engine damage due to insufficient lubrication. Simple blends of base oils having different viscosity characteristics generally do not meet the low and high temperature viscosity requirements of multigrade lubricating oils. The primary tool for meeting the requirements is the use of viscosity modifiers, also referred to as viscosity index improvers or V.I. improvers.

A viscosity modifier is conventionally an oil-soluble polymer, often a hydrocarbon-based polymer with a number average molecular weight in the range of about 20,000 to 200,000. These polymers, with their relatively large size, can significantly increase kinematic viscosities of base oils even at low concentrations. However, lubricating oil solutions containing these viscosity modifiers are non-Newtonian in nature. Consequently, these solutions tend to give lower viscosities than expected in a high shear environment. This behavior is believed to arise from shear-induced alignment of the V.I. polymer chains. In an operating internal combustion engine, viscosity modifiers therefore increase the low temperature, high shear (CCS) viscosity of a lubricating base oil to a lesser extent than they increase its high temperature viscosity. A point can be reached where the amount of viscosity modifier added to achieve the required minimum viscosity of the multigrade oil at high temperature precludes the possibility of meeting the required maximum viscosity at low temperature. Consequently, constraints exist on the amount of viscosity modifier which can be employed to meet the low and high temperature viscosity requirements of a lubricating oil composition.

Lubricating oil compositions generally also contain polymeric dispersant additives, whose primary function is to maintain insolubles formed by oxidation, etc. in a suspension in the oil and thus avoid sludge flocculation and precipitation. The dispersants are typically hydrocarbon polymers having a number average molecular weight ("$\overline{M}_n$") of about 10,000 or less that have been chemically modified to contain polar groups; e.g., nitrogen- and ester-containing groups. The amount of dispersant employed is dictated and controlled by the effectiveness of the particular material in achieving its dispersant function. Engine oils commercially available at U.S. service stations typically contain about two to four times as much dispersant as viscosity modifier, based on active ingredient.

Conventional dispersants can increase the low and high temperature viscosity characteristics of a base oil by virtue of their polymeric nature. However, because dispersant polymer molecules are much smaller than those of a viscosity modifier, the dispersant is much less shear sensitive. As a result, a dispersant contributes more to the low temperature viscosity of the lubricating oil relative to its contribution to the high temperature viscosity than does a viscosity modifier. Moreover, the dispersant, with its lower degree of polymerization, contributes much less to the high temperature viscosity of the base oil in an absolute sense than does the viscosity modifier. Thus, the magnitude of the low temperature viscosity increase induced by the dispersant can exceed the low temperature viscosity increase induced by the viscosity modifier without the benefit of a proportionately greater increase in high temperature viscosity as obtained from a viscosity modifier. Consequently, as the dispersant-induced low temperature viscosity increase causes the low temperature viscosity of the oil to approach the maximum low temperature viscosity permitted, it becomes increasingly difficult to introduce an amount of viscosity modifier sufficient to meet the minimum viscosity required at high temperature without crossing the low temperature viscosity threshold.

A continuing need exists for the development of improved dispersants which can provide viscosity benefits to lubricating oil compositions and at the same time achieve a dispersant function equal to or surpassing that of conventional dispersants.

Various oil-soluble, hydrocarbon-polymer-based dispersant additives suitable for use in lubricating oil compositions are disclosed in the art. EP-A-208560, for example, discloses dispersant additives formed by reaction of an amine, alcohol, amino alcohol and mixtures thereof with a polyolefin-substituted dicarboxylic acid material. The polyolefin-substituted dicarboxylic acid material is prepared by reaction of a polyolefin (e.g., polyisobutylene) having $\overline{M}_n$ of 1500 to 5,000 with an unsaturated dicarboxylic acid reactant (maleic anhydride), such that the polymer product (polyisobutenyl succinic anhydride) contains 1.05 to 1.25 moles of dicarboxylic acid producing moieties per mole of polyolefin used in the reaction. Suitable polyolefins include homopolymers and copolymers of $C_2$–$C_{10}$ monoolefins.

U.S. Pat. No. 5,229,022 teaches lubricating additives comprising ethylene-α-olefin copolymers terminally substituted with mono- or dicarboxylic acid producing moieties. The acid-substituted polymer can be further reacted with nucleophilic reagents such as amines, alcohols, and metal compounds to give other materials useful as additives, such as dispersants.

EP-A-490454 teaches alkenyl succinimide derivatives useful as dispersant additives, wherein the alkenyl group is derived from a terminally unsaturated atactic propylene oligomer. The succinimide derivative is formed by reacting the succinated oligomer with a $C_1$–$C_{50}$ amine.

Polyisobutylene ("PIB") has often been the polymer of choice in polymeric dispersants, chiefly because it is readily available by cationic polymerization from butene streams. PIB is a substantially amorphous material which generally contains residual unsaturation amounting to about one ethylenic double bond positioned along each polymer chain. The double bonds serve as the sites for functionalizing PIB by reaction with, for example, unsaturated carboxylic compounds such as maleic anhydride.

As indicated above, ethylene-α-olefin copolymers and α-olefin homo- and copolymers have also been disclosed to be useful in polymeric dispersants. The polymers prepared by polymerization of the corresponding monomers using conventional Ziegler-Natta catalysts are generally not suitable for use as backbones for lubricating oil dispersant additives. Conventional Ziegler-Natta catalysts have relatively high activity and several types of active sites, resulting in α-olefin polymers which have $\overline{M}_n$'s above 10,000 and relatively broad molecular weight distributions ("MWD"). Low molecular weight polymers can be obtained with these catalysts using a molecular weight regulator such as hydrogen, but this saturates the double bonds in the polymers, destroying the polymer's reactivity in functionalization chemistries useful for producing dispersants which rely on a high double bond content; e.g., functionalization with unsaturated carboxylic compounds such as maleic anhydride.

Ethylene-α-olefin copolymers and α-olefin homo- and copolymers in the dispersant molecular weight range can be prepared by polymerization of the corresponding monomers using catalysts composed of a metallocene compound (i.e., a cyclopentadienyl-containing transition metal compound) and a suitable activator or cocatalyst such as aluminoxane. For example, U.S. Pat. No. 5,229,022, noted above, describes the use of metallocenes for the preparation of ethylene-α-olefin copolymers. JP-A-63/057615 discloses liquid α-olefin random copolymers prepared by copolymerization of $C_3$ to $C_{20}$ α-olefins in the presence of catalysts formed from cyclopentadienyl zirconium hydride compounds and aluminoxane. The copolymers have 1–99 mole % of units derived from one of the monomers present in the copolymer, an inherent viscosity of 0.005–4 dl/g, MWD of no more than 3, iodine number of 0 to 85, and a C13-NMR spectrum indicating the copolymer has a regular head to tail structure. The copolymer is disclosed to contain terminal unsaturation on one end of the copolymer chains. Example 4 describes the preparation of a 1-butene-1-hexene copolymer with 15 mole % butene content, intrinsic viscosity of 0.02 dl/g, MWD of/1.82, and iodine number of 51.

JP-A-63/037102 discloses a modified liquid α-olefin polymer consisting of an unsaturated $C_3$ to $C_{10}$ carboxylic acid, anhydride, or ester thereof, bonded to an α-olefin homo- or copolymer prepared by polymerizing one or more $C_3$ to $C_{20}$ α-olefins using a zirconocene-aluminoxane catalyst system. The modified polymer is useful, inter alia, as an additive for lubricating oils. The starting polymer is disclosed to have an intrinsic viscosity of 0.005 to 0.4 dl/g, $\overline{M}_n$ of 300 to 8,000, MWD of 3 or less, and a C-13 NMR spectrum indicative of head-to-tail bonding, and an isotactic mm triad fraction of 0.35 or less. Example 4 discloses an n-butyl methacrylate-modified liquid propylene-butene-1 copolymer, prepared by heating the liquid polymer (which has 76 mole % propylene content, intrinsic viscosity of 0.03 dl/g, Mn of 730, MWD of 1.88, and an iodine value of 35) together with n-butyl methacrylate.

JP-A-01/132605 discloses epoxidated liquid α-olefin polymers which can be prepared from a liquid α-olefin polymer substantially like that disclosed in JP-A-63/037102 discussed in the last paragraph. The epoxidated polymers are useful, inter alia, as compatibility agents in lubricating oil compositions.

DE-A-4030399 teaches polymers and oligomers of propylene having functional end groups, which are produced by reaction of hetero-atom-containing organic compounds with polymers and oligomers composed of propylene and 0–40 wt. % of another $C_2$ to $C_8$ 1-alkene. The polymers and oligomers have $\overline{M}_n$ of 100 to 100,000, MWD of 1 to 3, and one unsaturated chain end. They are preferably prepared by polymerization of the monomer(s) in the presence of a bridged metallocene-aluminoxane catalyst system. Example 1 discloses the preparation of an isotactic propylene oligomer ($\overline{M}_n$=800;MWD=2.3) using a silane-bridged zirconocene. Subsequent examples disclose the preparation of anhydride-, mercaptan-, epoxide-, and carboxylic acid- terminated oligomers, among others, from the propylene oligomer prepared in Example 1. The hetero-atom functionalized polymers and oligomers are compatible with, and can be combined with, polar polymers to give alloys or copolymers.

SUMMARY OF THE INVENTION

The present invention is directed to an oil-soluble dispersant additive comprising the reaction product of:

(a) a copolymer functionalized to have within its structure at least one acyl functional group selected from the group consisting of $C_4$ to $C_{10}$ dicarboxylic acids and derivatives thereof and $C_3$ to $C_{10}$ monocarboxylic acids and derivatives thereof, the copolymer comprising units derived from 1-butene and at least one other α-olefin of formula $CH_2$=$CHR'$, wherein R' is methyl or a $C_3$ to $C_{12}$ linear or branched alkyl group, the copolymer having a number average molecular weight of at least about 700, a molecular weight distribution of less than 5, and ethenylidene groups terminating at least about 30% of all polymer chains; and (b) at least one derivatizing compound comprising a nucleophilic reactant.

The functionalized copolymers can be prepared by reaction of 1-butene-α-olefin copolymers with monounsaturated $C_4$ to $C_{10}$ dicarboxylic reactant compounds and monounsaturated $C_3$ to $C_{10}$ monocarboxylic reactant compounds. Suitable nucleophilic reactants include amines, alcohols, amino alcohols, reactive metal compounds, and mixtures thereof.

The dispersant additives have improved viscosity characteristics relative to the corresponding commercial PIB-based dispersants. More particularly, formulated oils and additive concentrates can be prepared using dispersant additives of the invention with a comparatively higher molecular weight without adversely affecting the viscometric properties of the system.

Because the dispersant additives are based upon copolymers having a relatively high level of terminal ethenylidene unsaturation, the additives have high active ingredient concentrations and, thereby, enhanced lubricating oil dispersancy, as exhibited by enhanced sludge and varnish control properties.

DETAILED DESCRIPTION OF THE INVENTION

Preparation of the 1-Butene-α-Olefin Copolymer

Figure 1:
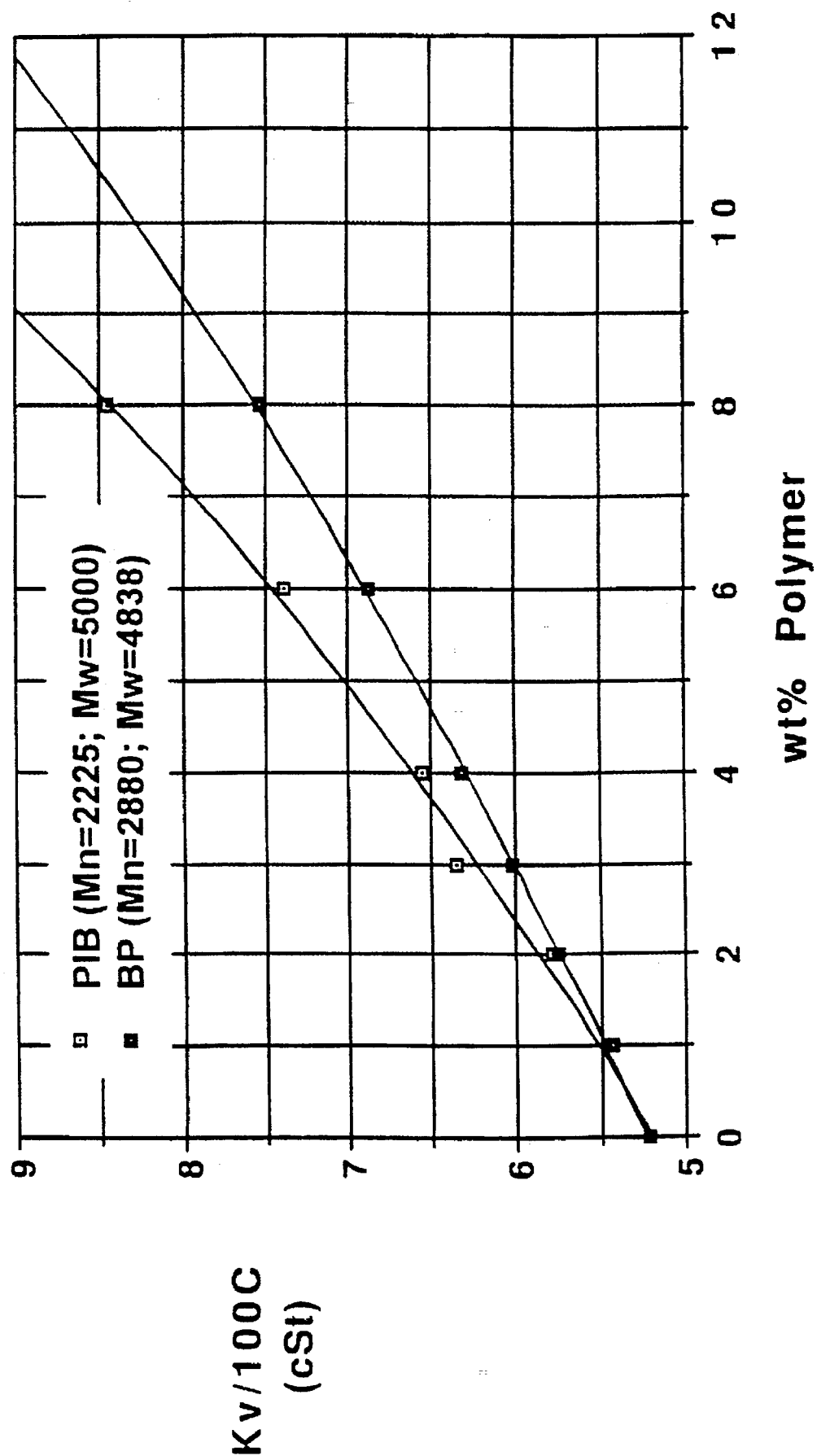
FIG. 1 is a plot of the kinematic viscosities of S150N mineral oil solutions of the 1-butene-propylene copolymer of Example 1 and of a polyisobutylene of $\overline{M}_n$=2,225 versus solution concentration.

The copolymers employed to make the dispersant additives of the invention are oil soluble copolymers which contain a high degree of terminal ethenylidene unsaturation and which are derived from 1-butene and at least one other α-olefin of formula:

$$CH2=CHR' \qquad (I)$$

wherein R' is methyl or a $C_3$ to $C_{12}$ linear or branched alkyl group. The R' group is preferably methyl or $C_3$ to $C_{10}$ alkyl, and more preferably methyl or $C_3$ to $C_8$ alkyl. When the alkyl group is branched, it preferably has at least one —$CH_2$— group between the ethenyl bond and the branch. Most preferably, the R' group is methyl or a linear alkyl group of from 3 to 6 carbon atoms; i.e., propyl, n-butyl, n-pentyl, or n-hexyl. A particularly preferred R' group is methyl.

Useful comonomers include propylene, 1-pentene, 1-hexene, 1-heptene, 1-octene, 1-nonene, 1-decene, 1-undecene, 1-dodecene, 1-tridecene, 1-tetradecene, 4-methyl-1-pentene, 5-methyl-1-hexene, 6-methyl-1-heptene, 7-methyl-1-octene, and the like. Preferred comonomers include propylene, 1-hexene, and 1-octene, and the most preferred is propylene. The 1-butene copolymers of the invention include ternary and higher copolymers, but binary copolymers are preferred. Thus, preferred copolymers include 1-butene-propylene copolymers, 1-butene-1-hexene copolymers, and 1-butene-1-octene copolymers. The most preferred are 1-butene-propylene copolymers.

The copolymers of the invention have a number average molecular weight of at least about 700, usually from about 700 to 10,000, preferably from about 1,000 to 5,000, and most preferably from about 1,500 to 4,000 (e.g., from 2,000 to 3,500). The copolymers also have a molecular weight distribution defined as the ratio of the weight average molecular weight to the number average molecular weight (i.e., MWD=$\overline{M}_w/\overline{M}_n$), of less than about 5, preferably less than 4, most preferably less than 3 (e.g., between 1.1 and 2.5). $\overline{M}_w$ and $\overline{M}_n$ can be determined by gel permeation chromatography (GPC) with suitable calibration. The use of GPC to determine $\overline{M}_w$ and $\overline{M}_n$ is described, for example, in W. W. Yau, J. J. Kirkland and D. D. Bly, *Modern Size Exclusion Liquid Chromatography*, John Wiley & Sons, New York, 1979.

The 1-butene copolymers of the invention possess a high degree of terminal ethenylidene unsaturation (also referred to as vinylidene unsaturation). Thus, one end of the copolymers has the formula POLY-C(R")=$CH_2$, wherein POLY represents the polymer chain and R" is $C_1$ to $C_{12}$ alkyl. If 1-butene terminates the chain, R" is ethyl; i.e., $C_2$ alkyl. Otherwise, the identity of the R" alkyl group depends upon the comonomer selected for polymerization with 1-butene. For example, if the selected comonomer is propylene and a propylene unit terminates the chain, R" is methyl. The copolymers of the invention have ethenylidene groups terminating at least about 30% of the polymer chains. More preferably, ethenylidene groups terminate at least 50% of the polymer chains, most preferably at least 70% of the polymer chains (e.g., 70 to 98%). In addition, a minor amount of the polymer chains can contain terminal ethenyl (also referred to as vinyl) unsaturation (i.e., POLY-CH=$CH_2$, where —CH=CH2 is ethenyl), and a portion of the polymers can contain internal monounsaturation (e.g., POLY-CH=CHR", where R" is defined as above). The percentage of polymer chains exhibiting terminal ethenylidene unsaturation may be determined by FTIR spectroscopic analysis, titration, or by C-13 or proton NMR.

The 1-butene copolymers of the invention comprise any oil soluble copolymer containing units derived from 1-butene with at least some units derived from comonomer (s) of formula (I), wherein the copolymer has high terminal unsaturation as described above. Preferably, however, copolymers of the invention contain at least about 5 mole %, more preferably at least 10 mole %, of units derived from the α-olefin comonomer(s). Correspondingly, the content of units derived from 1-butene is preferably no greater than about 95 mole %, and more preferably not greater than 90 mole %. In particular, 1-butenepropylene copolymers of the invention preferably contain from about 5 mole % to 40 mole % units derived from propylene (e.g. 10 to 40 mole %), more preferably from about 10 to 35 mole % (e.g. 15 to 35 mole %), most preferably from about 15 to 30 mole % (e.g., 18 to 25 mole %).

The copolymers utilized in the present invention can be characterized in terms of tacticity. The backbones of α-olefin homo- and copolymers generally consist of alternating methylene and methine carbons, with hydrocarbyl side chains attached to the methine carbons. Consequently, these polymers, unlike PIB, possess asymmetric carbons in their polymer backbones and can be characterized in terms of their stereochemical configuration; i.e., tacticity. In atactic α-olefin polymers, the hydrocarbyl side chains on the methine carbons have a random orientation about the polymer backbone. The methine carbons randomly have R and S configurations, creating adjacent pairs of either like configuration (a meso or "m" dyad) or unlike configuration (a racemic or "r" dyad). Atactic polymers contain approximately equal fractions of meso and racetalc dyads. Isotactic α-olefin polymers predominantly contain methine side chains oriented on the same side or plane of the polymer backbone, wherein any given sequence of three monomer units (triads) in the chain can be described as two successive meso dyads ("mm"). Syndiotactic polymers predominantly contain methine side chains that alternate sequentially from one side to the opposite side of the polymer backbone, wherein any given triad in the chain can be described as two successive racemic ("rr") triads.

In one embodiment of the present invention, the 1-butene copolymers employed to prepare the dispersant additives of the present invention can have a high isotactic index. The isotactic index is the percentage of isotactic (mm) triad sequences, based on the total number of triad sequences present in the copolymer chains. Syndiotactic (rr) and heterotactic (mr) triad sequences can also be present. The relative abundance of the triad sequences, and thus the isotacticity index, can be determined using carbon-13 NMR. A high isotactic index is defined herein to be at least 70%. 1-Butene copolymers of formula (I) with isotactic indexes of 70% to 75% or 80% or higher (e.g., 80% to 99%) can be incorporated into the dispersant additives of the invention.

Highly isotactic polymers are often crystalline materials which are unsuitable for use as the backbones in dispersant additives because of their limited oil solubility. Highly isotactic poly-1-butenes, for example, typically have little or no oil solubility at $\overline{M}_n$'s greater than about 1,500. On the other hand, the highly isotactic 1-butene copolymers which can be employed to make the dispersant additives of the invention are sufficiently amorphous to have oil solubility at $\overline{M}_n$'s well above 1,500. The units derived from the α-olefin of formula (I) introduce side chains of a length different than that of the ethyl side chains introduced by units derived from 1-butene. The presence of two side chains having different chain lengths along the main polymer chain disrupts and lowers the crystallinity of the copolymer (i.e., increases its amorphous nature) and, relative to analogous poly-1-butene having the same degree of polymerization, either imparts or substantially enhances oil solubility.

The 1-butene-α-olefin copolymers useful in the present invention can be prepared by polymerizing monomer mixtures comprising 1-butene and an α-olefin of formula (I) in the presence of a catalyst system comprising the reaction or complexation product of a cyclopentadienyl-containing transition metal compound (also referred to as a metallocene) and a cocatalyst. The metallocene is typically a cyclopentadienyl derivative of a Group IVB-VIB transition metal of the Periodic Table of the Elements disclosed in the *Handbook of Chemistry and Physics*, 61st edition, CRC Press, 1980. The metallocene is converted into an active polymerization catalyst by reacting or combining it with a co-catalyst, which is typically either an aluminoxane or an ionic activator, e.g., an ion exchange compound or an anion of a Lewis acid.

Illustrative of the useful metallocenes are those containing two cyclopentadienyl ligands as represented by the formula:

(II)

wherein Cp and Cp* are the same or different cyclopentadienyl rings substituted with from 0 to 5 substituent groups S and S* respectively, wherein S and S* are independently selected from radical groups which form covalent bonds to the carbon atoms of the Cp-rings, and include hydrocarbyl radicals, substituted hydrocarbyl radicals wherein one or more hydrogens is replaced by halogen, halocarbyl radicals, hydrocarbyl-substituted Group IVA metalloid radicals, halocarbyl-substituted Group IVA metalloid radicals, disubstituted boron radicals, disubstituted pnictogen radicals, substituted chalcogen radicals, and halogen radicals. Alternatively, Cp and Cp* are cyclopentadienyl rings in which any two adjacent S or S* groups can be joined to form a $C_4$ to $C_{20}$ ring to give a saturated or unsaturated polycyclic cyclopentadienyl ring.

A' is a bridging group which serves to restrict rotation of the Cp and Cp* rings; y is 0 or 1; M is titanium, zirconium, or hafnium; X and X' are independently halogen radicals, hydride radicals, hydrocarbyl radicals, substituted hydrocarbyl radicals in which one or more hydrogen atoms is replaced by halogen, halocarbyl radicals, and hydrocarbyl- or halocarbyl- substituted organometalloid radicals. Alternatively, X and X' are joined and bound to the metal atom M to form a metallacycle ring containing from about 3 to 20 carbon atoms.

The hydrocarbyl and substituted hydrocarbyl radicals which are suitable S, S*, X and X' include straight and branched alkyl and alkylenyl radicals (e.g., methyl, chloromethyl, ethyl, propyl, propenyl, isopropyl, etc.), cyclic hydrocarbon radicals (e.g., cyclohexyl, bromocyclohexyl, etc.), alkyl-substituted cyclic hydrocarbon radicals, aromatic radicals (e.g., phenyl, p-chlorophenyl, and the like), and alkyl-substituted aromatic radicals (e.g., toluyl, p-chloromethyl phenyl, etc.). The hydrocarbyl and substituted hydrocarbyl radicals preferably contain from about 1 to 20 carbon atoms.

The halocarbyl radicals suitable as S, S*, X and X' are analogous to the hydrocarbyl radicals described in the preceding paragraph, except that all of the hydrogen atoms have been replaced by halogen atoms.

The organometalloid radicals suitable as S, S*, X and X' include mono-, di- and trisubstituted organometalloid radicals of Group IVA elements in which each of the hydrocarbyl groups and the halocarbyl substituents are as respectively defined in the preceding two paragraphs. Suitable hydrocarbyl-substituted Group IVA organometalloid radicals include trimethylsilyl, triethylsilyl, triphenylsilyl, ethyldimethylsilyl, triphenylgermyl, trimethylgermyl, and the like.

Halogen radicals suitable for S, S*, X and X' are fluoride, chloride, bromide, and iodide.

Disubstituted boron radicals suitable as S and S* can be represented by the formula $R^aR^bB-$; suitable disubstituted pnictogen radicals by $R^aR^bA-$; and suitable substituted chalcogen radicals by $R^aG-$; wherein B is boron; A is a Group VA atom; G is a Group VIA atom, and $R^a$ and $R^b$ are independently selected from the group consisting of hydride, hydrocarbyl radicals, and substituted hydrocarbyl radicals in which one or more hydrogens are replaced with halogen. Thus, among the suitable disubstituted boron radicals are dialkylboryl, dicycloalkylboryl, diarylboryl, dialkarylboryl, and the like. Suitable disubstituted pnictogens include amino, dialkylamino, diarylamino, dicycloalkylamino, phosphino, dialkylphosphino, diarylphosphino, dialkylarsino, and the like. Suitable substituted chalcogen radicals include hydroxy, alkoxy, cycloalkoxy, aryloxy, arylalkoxy, mercapto, alkylthio, cycloalkylthio, arylthio, and the like.

Exemplary of saturated or unsaturated polycyclic cyclopentadienyl rings formed by the joining of two adjacent S or S* groups are indenyl, 4,5,6,7-tetrahydroindenyl, fluorenyl, and octahydrofluorenyl.

A' is a radical which structurally bridges the cyclopentadienyl ring ligands. Among the suitable A' are divalent hydrocarbon radicals, such as alkylidene radicals; e.g., methylidene, ethylidene and propylidene. Other suitable A' include silicon-containing radicals such as silanylene, silaalkylene, oxasilanylene and oxasilaalkylene.

Unbridged metallocenes are represented by formula (II) when y=0.

To prepare isotactic 1-butene copolymers for use in the dispersant additives of the invention, the metallocene employed in the catalyst system is a chiral compound either in its pure L or pure D form or a racemic mixture thereof. The metallocenes of formula (II) useful for preparing isotactic 1-butene copolymers are those where S and S* are chosen such that the metallocenes have no plane of symmetry containing the metal center and have a $C_2$ axis of symmetry through the metal center.

Illustrative examples of bridged metallocenes of Formula (II) which can be employed for the production of 1-butene copolymers are dimethyl-silylbis(indenyl) zirconium dimethyl; dimethylsilylbis (indenyl) zirconium dichloride; ethylenebis(indenyl) zirconium dimethyl; ethylenebis (indenyl) zirconium dichloride; dimethylsilylbis(4,5,6,7-tetrahydroindenyl) zirconium dimethyl; dimethylsilylbis(4, 5,6,7-tetra-hydroindenyl) zirconium dichloride; ethylenebis (4,5,6,7-tetrahydroindenyl) zirconium dimethyl; ethylenebis (4,5,6,7-tetrahydroindenyl) zirconium dichloride; dimethylsilylbis(3-methylcyclopentadienyl) zirconium dimethyl; and ethylenebis(3-methylcyclopentadienyl) zirconium dichloride; and the hafnium 20 analogs of the foregoing zirconium metallocenes. The foregoing metallocenes can be employed in their pure L, pure D, racemic and/or meso forms. Racemic forms of the foregoing metallocenes can produce isotactic polymers.

Illustrative examples of unbridged metallocenes represented by formula (II) (y=0) are the dialkyl metallocenes such as bis(cyclopentadienyl)titanium dimethyl, bis(cyclopentadienyl)titanium diphenyl, bis(cyclopentadienyl)titanium dibenzyl, bis(cyclopentadienyl)zirconium dimethyl, bis(cyclopentadienyl)zirconium diphenyl, and bis(cyclopentadienyl)zirconium dibenzyl; and mono alkyl metallocenes such as bis(cyclopentadienyl)zirconium hydrochloride, bis(cyclopentadienyl)zirconium methyl chloride, and bis(cyclopentadienyl)zirconium phenyl chloride.

Illustrative examples of unbridged metallocenes represented by formula (II) (y=0) which provide tacticity control by having substituents on the cyclopentadienyl rings of sufficient steric bulk to restrict rotation of the cyclopentadienyl ligands, and thereby satisfy the symmetry conditions necessary to produce isotactic polymers as noted above, include bis(tricyclo[5.2.1.0$^{2,6}$]deca-2,5-dienyl)zirconium dimethyl, bis((1R)-9,9-dimethyltricyclo[6.1.1.0$^{2,6}$]deca-2,5-dienyl)zirconium dimethyl, bis(tricyclo[5.2.1.0$^{2,6}$]deca-2,5,8-trienyl)zirconium dimethyl, bis(tricyclo[5.2.2.0$^{2,6}$]undeca-2,5,8-trienyl) zirconium dimethyl, bis((1R,8R)-7,7,9,9-tetramethyl [6.1.1.0$^{2,6}$]deca-2,5-dienyl)zirconium dimethyl and the hafnium analogs of the foregoing zirconium metallocenes.

The metallocenes described above may be activated to a catalytic state by reaction, combination, or complexation with a cyclic aluminoxane of formula (R$^e$-Al-O)$_p$ or a linear aluminoxane of formula R$^e$(R$^e$-Al-O)$_q$, wherein R$^e$ is C$_1$ to C$_5$ alkyl (e.g., methyl, ethyl, propyl, butyl or pentyl), and p and q are integers from 2 to about 25. Most preferably, R$^e$ is methyl and p and q are at least 4. Aluminoxanes can be prepared as described in U.S. Pat. No. 5,153,157, the disclosure of which is incorporated by reference.

The metallocenes of formula (II) in which X and X' are independently selected from the group consisting of hydride radicals, C$_1$ to C$_{20}$ hydrocarbyl radicals, C$_1$ to C$_{20}$ substituted hydrocarbyl radicals in which one or more hydrogen atoms is replaced by a halogen, and C$_1$ to C$_{20}$ hydrocarbyl-substituted Group IVa metalloid radicals, or in which X and X' are joined and bound to M to form a C$_3$ to C$_{20}$ metallacycle, may also be activated by ionic activators such as ion-exchange compounds. The ion exchange compounds typically comprise a cation capable of irreversibly reacting with a ligand of the metallocene (e.g., by donation of a proton) or of being otherwise reactable with a non-cyclopentadienyl ligand of the metallocene and an anion which is compatible with and non-coordinating to the metallocene cation generated by the reaction of the metallocene with the activator.

The activator compounds containing single anionic coordination complexes can be represented by the formula:

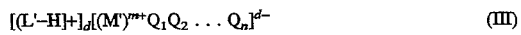
$$[(L'-H]+]_d[(M')^{m+}Q_1Q_2\ldots Q_n]^{d-}\qquad(III)$$

wherein L' is a neutral Lewis base; H is a hydrogen atom; [L'-H] is a Bronsted acid; M' is a metal or metalloid; Q$_1$ to Q$_n$ are, independently, hydride radicals, hydrocarbyl and substituted-hydrocarbyl radicals, halocarbyl and substituted-halocarbyl radicals and hydrocarbyl- and halocarbyl-substituted organometalloid radicals, disubstituted pnictogen radicals, substituted chalcogen radical and any one, but not more than one, of Q$_1$ to Q$_n$ may be a halogen radical; m is an integer representing the formal valence charge of M'; n is the total number of ligands Q; and n-m=d.

Any metal or metalloid capable of forming an anionic complex which is stable in water may be used or contained in the anion of the second compound. Suitable metals include aluminum, gold, platinum and the like. Suitable metalloids include boron, phosphorus, silicon and the like. Because of their commercial availability, salts containing anions comprising a coordination complex containing a single boron atom (e.g., tetra(pentafluorophenyl)boron anion) are preferred. Suitable compounds containing comprising a single boron atom include di- and tri-alkyl ammonium salts, N,N-dialkyl anilinium salts, and triaryl phosphonium salts.

Ionic activators of formula (III) can also contain a plurality of boron atoms such as carboranes, metallacarboranes and boranes.

Further description, including other examples, of ionic activators which contain a single anion and which may be used to activate the chiral metallocenes is provided by EP-A-277003, EP-A-277004, WO-A-92/00333, and by copending, commonly assigned U.S. Ser. No. 852437 (filed Mar. 16, 1992), the disclosures of all of which are incorporated by reference.

Alternatively, the ion exchange compound may contain a compatible, non-coordinating polyanion as described in WO-A-93/011172, the disclosure of which is incorporated by reference.

The metallocenes useful for the production of the 1-butene copolymers employed in the present invention may also be activated by an anion of a Lewis acid having a relative Lewis acidity greater than or equal to that of phenylbis(perfluorophenyl)borane, as described in EP-A-520732, the disclosure of which is incorporated by reference.

A metallocene-aluminoxane olefin polymerization catalyst may alternatively be produced as a reaction product in accord with U.S. Pat. No. 4,752,597, which discloses that a solid reaction product is obtained by reacting at least one metallocene of a metal of Group IVB of the Periodic Table with an aluminoxane at a mole ratio of about 1:12 to 1:100 based on the metal and aluminum.

The catalyst system obtained by contact of the metallocene and the aluminoxane or ionic activator may be homogeneous, heterogeneous or supported and may be formed prior to introduction of the components into the polymerization reactor. The homogeneous catalyst may be formed in the reactor by admixture of the components in the polymerization solvent. The supported catalyst systems can be prepared by adsorbing and complexing the metallocene and the activator on a catalyst support material. Further description of supported catalyst systems is found in U.S. Pat. No. 5,057,475, U.S. Pat. No. 5,017,714, and application U.S. Ser. No. 468382 (filed Jan. 22, 1990, now abandoned), U.S. Pat. No. 5,240,894, and commonly assigned, copending U.S. Ser. No. 926006 (filed Aug. 5, 1992), the disclosures of all of which are incorporated by reference.

The polymerization may be carried out as a solution or a slurry polymerization. The polymerization may be conducted using the liquid comonomer reactants; i.e., 1-butene and at least one α-olefin of formula (I), as the reaction medium. Alternatively, a hydrocarbon solvent/diluent inert to the polymerization can also be employed. Suitable diluents include straight- and branched-chain hydrocarbons (e.g., propane, isobutane, butane, pentane, isopentane, hexane, heptane, octane, etc. and mixtures thereof), cyclic and alicyclic hydrocarbons (e.g., cyclohexane, cycloheptane, methylcyclopentane, methylcyclohexane, etc. and mixtures thereof), and aromatic hydrocarbons (e.g., benzene, toluene, xylene, etc. and mixtures thereof).

The feedstream containing the 1-butene reactant may optionally contain other C$_4$ hydrocarbons. The feedstream typically comprises less than about 5 wt.%, preferably less than 4 wt.%, and most preferably less than 3 wt.% isobutylene; at least about 12 wt.%, preferably at least 30 wt.%, and most preferably at least 45 wt.% total n-butenes (i.e., 1-butene and 2-butene); less than about 1 wt. % butadiene; and n-butane and isobutane. The isobutylene and 2-butene components of the $C_4$ feedstream are substantially non-reactive in the presence of the catalyst systems and under the polymerization conditions employed as described herein, so that the resulting polymer contains essentially no units derived from polymerization of 2-butene and isobutylene.

These $C_4$ feedstreams can comprise spent $C_4$ streams produced as by-products of the manufacture of polyisobutylene or methyl-tert-butyl ether wherein the $C_4$ feedstream (often referred to as Raffinate II) contains less than about 5 wt.% isobutylene, about 10 to 70 wt.% saturated butanes and about 15 to 85 wt.% 1-butene and 2-butene. The saturated butanes function as a diluent or solvent in the reaction mixture, as do isobutylene and 2-butene. Typically the $C_4$ feed stream is maintained at a sufficient pressure to be in the liquid form both at the reactor inlet and in the reaction mixture itself at the reaction temperature.

The 1-butene and α-olefin comonomer(s) of formula (I), whether each is employed as a pure liquid or a liquid mixed with a solvent/diluent, may be fed to the polymerization reactor as separate streams or as a single, pre-mixed stream, wherein the α-olefin content of the resulting polymer is controlled, inter alia, by the wt. % of α-olefin monomer(s), based upon the total weight of monomer, entering the reactor, the particular polymerization conditions employed and the catalyst system selected.

When an aluminoxane activator is employed in the catalyst system, the mole ratio of Al to transition metal can be in the range of about 0.5 to 100,000, preferably about 1 to 2,000, and most preferably about 1 to 1,500; e.g., 100 to 1,000. When an ionic activator is employed, the catalyst system may be prepared at activator to metallocene ratios of about 0.1 to 10, preferably about 0.3 to 3.

The polymerization is generally conducted at temperatures ranging between about −20° and 300° C., preferably between about 0° and 200° C., e.g., between 30° and 150° C. The above-described catalyst systems are suitable for the polymerization of the 1-butene with the α-olefin comonomers of formula (I) in solution over a wide range of pressures, wherein the pressure is typically controlled to maintain the diluent and the reactant monomers in the liquid phase at the selected polymerization temperature. Accordingly, the polymerization pressure is generally in the range of from about 100 to 300,000 kPa (1 to 3,000 bar), preferably from about 200 to 150,000 kPa (2 to 1,500 bar), and most preferably about 400 to 100,000 kPa (4 to 1,000 bar); e.g., 500 to 2,500 kPa (5 to 25 bar).

Reaction time is not critical and may vary from several hours or more to several minutes or less, depending upon factors such as reaction temperature, reaction pressure, and the like. One of ordinary skill in the art may readily obtain the optimum reaction time for a given set of reaction parameters by routine experimentation.

The polymerization reaction can be terminated by such conventional processes as contacting the polymerization reaction medium with water, caustic, dilute acids or alcohol (e.g., methanol, propanol, isopropanol and the like) to deactivate the catalyst system and/or cooling or flashing the medium. The product polymer can then be recovered and purified by processes well known in the art.

The polymerization can be conducted as either a batch or continuous process. When conducting a batch polymerization, 1-butene and the α-olefin comonomer(s) of formula (I), optionally with diluent, can be charged together in one admixture or separately in any combination at appropriate ratios to a suitable reactor. When separate streams are employed, the monomers can be charged simultaneously or sequentially in any order. Care must be taken that all ingredients are dry and substantially free of $O_2$, CO, $CO_2$ and N-, O-, and S- polar compounds, with the reactants typically being passed through molecular sieves or other drying means prior to their introduction into the reactor. Subsequently, the catalyst and activator pre-mixed in a solvent/diluent are charged to the reactor while the reaction mixture is agitated to start the polymerization reaction. Alternatively, the catalyst and the activator can be separately charged to the reactor either simultaneously or sequentially in either order. Generally, the reaction mixture is agitated by stirring or other means during the entire polymerization. As polymer is being formed, additional monomer may be added to the reactor. Upon completion of the reaction, unreacted monomer and solvent are either flashed or distilled off, if necessary by vacuum, and the polymer withdrawn from the reactor.

The polymerization may be conducted continuously or semi-continuously by feeding to a reactor the catalyst and activator in separate streams or admixed in one stream, simultaneously feeding the 1-butene, comonomer(s), and (optionally) diluent in any combination of separate streams or together in one stream, and by simultaneously withdrawing from the reactor any unreacted monomer, diluent and polymer so as to allow a residence time of ingredients long enough for forming polymer of the desired molecular weight. After withdrawal from the reactor, the polymer is separated from the reaction mixture.

The preferred method for preparing the 1-butene-α-olefin copolymers of the invention is a continuous polymerization process using a metallocene catalyst and employing a dilute 1-butene-containing liquid feedstream wherein the amount of diluent is at least 30 wt. % of the stream before admixture with the α-olefin of formula (I). The preferred method is disclosed in commonly assigned, copending U.S. Ser. No. 257398 (Docket No. PT-974), filed Jun. 9, 1994 entitled "DILUTE PROCESS FOR THE POLYMERIZATION OF NON-ETHYLENE α-OLEFIN HOMOPOLYMERS AND COPOLYMERS USING METALLOCENE CATALYST SYSTEMS", the disclosure of which is incorporated herein by reference.

Preparation of the Functionalized Polymer

The functionalized polymer employed to make the dispersant additives of the invention is prepared by chemically modifying the butene-1 copolymer (hereinafter, alternatively, referred to simply as the polymer) to have moieties present within its structure which contain or constitute at least one acyl functional group selected from the group consisting of $C_4$ to $C_{10}$ dicarboxylic acids and derivatives thereof and $C_3$ to $C_{10}$ monocarboxylic acids and derivatives thereof. In particular, the polymer functionalized with mono- or dicarboxylic acid material suitable for use in this invention includes the reaction product of the polymer with a monounsaturated carboxylic reactant comprising at least one member selected from the group consisting of (i) monounsaturated $C_4$ to $C_{10}$ dicarboxylic acids wherein (a) the carboxyl groups are attached to adjacent carbon atoms and (b) at least one of the adjacent carbon atoms is part of the monounsaturation; (ii) anhydride or $C_1$ to $C_5$ alcohol derived mono- or diester derivatives of (i); (iii) monounsaturated $C_3$ to $C_{10}$ monocarboxylic acids wherein the carbon-carbon double bond is allylic to the carboxy group; and (iv)

C₁ to C₅ alcohol derived monoesters of(iii). Upon reaction with the polymer, the double bond of the monounsaturated carboxylic reactant becomes saturated. Thus, for example, maleic anhydride reacted with the polymer becomes succinic anhydride, maleic acid becomes succinic acid, and acrylic acid becomes a propionic acid.

Suitable unsaturated acid materials useful as functional compounds include acrylic acid, methacrylic acid, maleic acid, maleic anhydride, fumaric acid, and the like. Particularly preferred are the unsaturated dicarboxylic acids and their derivatives, especially maleic acid, fumaric acid and maleic anhydride.

A portion of the polymer normally does not react with the monounsaturated carboxylic reactant, so that the product mixture will contain unfunctionalized polymer. The product mixture, which is stripped of any monounsaturated carboxylic reactant, can be used in further derivatization reactions to make, for example, dispersant.

The polymer product can be characterized in terms of its active ingredient (A.I.), which is the weight fraction of functionalized polymer, based on the total weight of functionalized and unfunctionalized polymer in the product. The A.I. for polymers of the present invention is typically at least 0.50, preferably from 0.65 to 0.99, more preferably 0.75 to 0.99, and most preferably 0.85 to 0.99.

The polymer can be functionalized with the monounsaturated carboxylic reactant by a variety of methods. Such methods include halogen assisted functionalization, the "ene" reaction, and free radical grafting. For halogen assisted polymer functionalization, the polymer can be first halogenated to about 1 to 8 wt. % halogen (e.g., chlorine or bromine), based on the weight of polymer, by passing the halogen through the polymer at a temperature of 60° to 250° C. for about 0.5 to 10 hours. The halogenated polymer may then be reacted with sufficient monounsaturated carboxylic reactant at 100° to 250° C. for about 0.5 to 10 hours so the product obtained will contain the desired number of moles of the monounsaturated carboxylic reactant per mole of the halogenated polymer. Processes of this general type are taught in U.S. Pat. No. 3,087,936, U.S. Pat. No. 3,172,892, and U.S. Pat. No. 3,272,746, the disclosures of which are incorporated by reference. Alternatively, the polymer and the monounsaturated carboxylic reactant can be mixed and heated while adding halogen (e.g., chlorine) to the hot material. Processes of this type are disclosed in U.S. Pat. Nos. 3,215,707, 3,231,587, 3,912,764, 4,110,349, and 4,234,435 and in UK-A-1440219, the disclosures of all of which are incorporated by reference.

The polymer and the monounsaturated carboxylic reactant can also be contacted at elevated temperatures to cause a thermal "ene" reaction to occur. Generally, the polymer and carboxylic reactant will be contacted with stirring and in the absence of O₂ and water (e.g., under N₂) in a carboxylic reactant to polymer mole ratio of about 1:1 to 10:1 at a temperature of about 120° to 260° C. for about 1 to 20 hours. Thermal "ene" processes are described in U.S. Pat. No. 3,361,673 and U.S. Pat. No. 3,401,118, the disclosures of which are incorporated by reference.

Functionalized polymer can be prepared using a thermal "ene" type reaction or by chlorination as disclosed in U.S. Pat. No. 5,266,223, the disclosure of which is incorporated by reference.

The monounsaturated carboxylic reactant can be grafted onto the polymer in solution or in solid form using a radical initiator (e.g., peroxides, azo compounds, and the like) to form a functionalized polymer having carboxylic acid moieties or derivatives randomly distributed within its structure. The free radical-induced grafting is generally carried out at an elevated temperature in the range of about 100° to 250° C., preferably in an inert atmosphere (e.g., N₂ blanket).

Derivatized Polymers

The functionalized polymer (i.e., polymer substituted carboxylic acids/anhydrides/esters) prepared as described above can be derivatized by reaction with a nucleophilic reactant such as amines, amino alcohols, alcohols, reactive metals, reactive metal compounds, etc. to form derivatized polymer. The derivatized polymer compositions of the present invention can be used as dispersant additives in lubricant and fuel compositions.

Derivatized Polymer From Amines

Useful amine compounds for derivatizing functionalized polymers comprise at least one amine and can comprise one or more additional amines or other reactive polar groups. The functional group comprising a carboxylic acid, ester or derivative thereof reacts with the amine to form an amide or imide.

Preferred amines are aliphatic saturated amines, including mono- and (preferably) polyamines containing about 2 to 60, preferably 2 to 40 (e.g. 3 to 20), total carbon atoms and about 1 to 12, preferably 3 to 12 (e.g., 3 to 9 nitrogen atoms) in the molecule. These amines may be hydrocarbyl amines or may be hydrocarbyl amines including other groups, e.g., hydroxy groups, alkoxy groups, amide groups, nitriles, imidazoline groups, and the like. Hydroxy amines (also referred to as amino alcohols) with 1 to 6 hydroxy groups and polyethylenepolyamines such as diethylene triamine, triethylene tetramine, tetraethylene pentamine and the like and mixtures thereof, are particularly useful.

Useful amines also include alicyclic diamines, heterocyclic nitrogen compounds such as imidazolines, commercial mixtures of amines compounds (e.g., polyethylenepolyamine compounds averaging 5 to 7 nitrogen atoms per molecule available under trade names such as "Polyamine H", "Polyamine 400", etc.), polyoxyalkylene polyamines, and the polyamido and related amines described in U.S. Pat. Nos. 4,857,217, 4,963,275, and 4,956,107, the disclosures of which are incorporated by reference.

The ashless dispersant may be prepared by reacting the amine compound with the polymer of the invention functionalized with mono- or dicarboxylic acid material (e.g., succinic anhydride) dissolved or diluted in an inert organic liquid (e.g., mineral oils) to a concentration of about 5 to 95 wt. %. The reaction is generally conducted at about 100° to 250° C. for about 1 to 10 hours until the desired amount of water is removed. The heating is preferably carried out to favor formation of imides or mixture of amides and imides, rather than amides and salts. The relative proportions of the functionalized polymer and the amine can vary considerably depending upon the reactants and the type of bonds formed, but generally from 0.05 to 1 mole of mono- or dicarboxylic acid producing moiety content in the functionalized polymer is used per equivalent of amine.

Derivatized Polymer From Alcohols

The functionalized polymers can be reacted with alcohols to form esters. The alcohols may be monohydric alcohols, polyhydric alcohols, aromatic hydroxy compounds, unsaturated alcohols, ether-alcohols or amino-alcohols. The polyhydric alcohols are the most preferred alcohols and preferably contain from about 2 to 10 hydroxy radicals. Suitable polyhydric alcohols include ethylene glycol, diethylene glycol, triethylene glycol, glycerol, pentaerythritol, and so forth. The functionalized, e.g., acid functionalized, polymers of this invention are reacted with the alcohols according to conventional esterification techniques. This normally involves heating the functionalized polymer with the alcohol, optionally in the presence of a normally liquid, substantially inert, organic liquid solvent/diluent. Temperatures from at least about 100° C. up to the temperature at which one or more of the reactants decompose are used. The temperature is usually within the range of about 100° up to 300° C., and typically from about 140° to 250° C. The esterification may optionally be conducted in the presence of an esterification catalyst (e.g., sulfuric acid, p-toluene sulfonic acid, and the like).

Derivatized Polymer From Reactive Metals/Metal Compounds

The functionalized polymers of the invention can be reacted with reactive metals or reactive metal compounds to form metal salts or metal-containing complexes. Metal salts are formed by reaction of the functionalized polymer (i.e., polymer substituted mono- and dicarboxylic acid materials) with the reactive metal or metal compounds. Metal complexes are typically achieved by reacting the functionalized polymers with amines and/or alcohols as discussed above and also with complex forming reactive metal compounds either during or subsequent to amination and/or esterification. Generally, the compounds of alkali metals, alkaline earth metals, and the transition metals are useful for forming the metal salts and complexes. Suitable compounds include oxides, alkoxides, hydroxides, phenoxides, alkylates (e.g., methylates), nitrates, nitrites, halides, carboxylates, phosphates, phosphites, sulfates, sulfites, carbonates and borates.

More particularly, complex-forming metal reactants include the nitrates, nitrites, halides, carboxylates, phosphates, phosphites, sulfates, sulfites, carbonates, borates, and oxides of cadmium as well as metal having atomic numbers from 24 to 30 (including chromium, manganese, iron, cobalt, nickel, copper and zinc). These metals are the so-called transition or co-ordination metals; i.e., they are capable of forming complexes by means of their secondary or co-ordination valence. Further disclosure directed to the reactive metal compounds suitable for forming such complexes and of processes for preparing the complexes can be found in U.S. Pat. No. 3,306,908, the disclosure of which is incorporated by reference.

Reactive metal compounds useful in preparing salts from the functionalized polymer and/or an amine derivatized polymer as described above include the oxides, hydroxides, carbonates, halides, alkylates (e.g., methylates), and phenoxides of the alkali metals, alkaline earth metals, zinc, cadmium, lead, cobalt and nickel. Further disclosure directed to these reactive metal compounds and of processes for preparing the functionalized polymer salts therefrom can be found in U.S. Pat. No. 26,433, the disclosure of which is incorporated by reference.

The functionalized polymer can be reacted with any individual amine, alcohol, reactive metal, reactive metal compound or any combination of two or more of any of these. Furthermore, the functionalized polymer can be reacted with the amines, alcohols, reactive metals, reactive metal compounds, or their mixtures simultaneously (concurrently) or sequentially in any order.

Post Treatment—Boration

The amine and alcohol derivatized polymers of the present invention as described above can be post-treated for use as dispersants with a borating agent selected from the group consisting of boron oxide, boron halides, boron acids and esters of boron acids in an amount to provide from about 0.1 atomic proportion of boron for each mole of the nitrogen composition to about 20 atomic proportions of boron for each atomic proportion of nitrogen used. The borated derivatized polymer can contain from about 0.05 to 2.0 wt. %, e.g. 0.05 to 0.7 wt. % boron based on the total weight of said borated nitrogen-containing dispersant compound.

Treating can be carried out by adding from about 0.05 to 4 wt. % (based on the weight of the derivatized polymer) of the borating agent and heating with stirring at from about 100° to 190° C. for from 1 to 5 hours, followed by nitrogen stripping. A preferred borating agent is boric acid, which is usually added as a slurry to said nitrogen compound.

Lubricating Compositions

As already noted, the derivatized polymer is useful as an additive, particularly a dispersant additive, in oleaginous compositions. The additives of the present invention may be used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to 0.5, and preferably about 0.005 to 0.15 wt. %, based on the total weight of the composition, will usually be employed.

The additives of the present invention find their primary utility in lubricating oil compositions which employ a base oil in which the additives are dissolved or dispersed therein. The base oils are oils of lubricating viscosity and may be natural oils (e.g., liquid petroleum oils) or synthetic oils (e.g., hydrocarbon oils such as polybutylenes, end-group modified alkylene oxide polymers and copolymers such as diethyl ether of polypropylene glycol, polyol esters, and the like) or mixtures thereof.

The additives of the present invention can be incorporated into a lubricating oil in any convenient way. They can be added directly to the oil by dispersion or dissolution in the oil at the desired level of additive concentration. Alternatively, the additives can be blended with a suitable oil-soluble solvent and base oil to form a concentrate, and the concentrate can then be blended with a lubricating oil basestock to obtain the final formulation. Such dispersant concentrates will contain, on an A.I. basis, from about 10 to 80 wt. %, typically about 20 to 60 wt. %, and preferably from about 40 to 50 wt. %, additive, and typically from about 40 to 80 wt. %, preferably from about 40 to 60 wt. %, base oil, based on the concentrate weight.

The additives of the present invention may be mixed with other types of conventional additives, each selected to perform at least one desired function. Among the other additives which may be in the lubricating oil formulation are metal containing detergent/inhibitors, viscosity modifiers, anti-wear agents and pour depressants. The metal detergent/inhibitors are generally basic or overbased alkali or alkaline earth metal salts or mixtures thereof, (e.g. mixtures of Ca and Mg salts) of one or more organic acids, (e.g., sulfonates, naphthenates, phenates and the like). Viscosity modifiers are generally hydrocarbon polymers or polyesters, optionally derivatized to impart dispersancy or some other property, having number average molecular weights of from $10^3$ to $10^6$. The antiwear agents are typically oil-soluble zinc dihydrocarbyl dithiophosphates.

Compositions, when containing one or more of these additives, typically are blended into the base oil in amounts which are effective to provide their normal attendant function. In such compositions, the additives of the present invention are generally employed (e.g., as a dispersant additive) in an amount of about 0.1 to 20 wt. %, preferably about 0.1 to 6 wt. %, based upon the total weight of the composition.

Additive concentrates comprising concentrated solutions of the additives of this invention together with one or more of these other additives can be prepared by adding the additives to the base oil, wherein the subject additives of this invention are present in concentrate amounts as described above. The collective amounts of the subject additive together with other additives is typically from about 2.5 to 90 wt. %, preferably about 15 to 75 wt. %, and most preferably about 25 to 60 wt. % additives with base oil as the balance. The concentrate will typically be formulated to contain the additives in the amounts necessary to provide the desired concentration in the final formulation when the concentrate is combined with a predetermined amount of base lubricant.

The invention is described in more detail, though only by way of illustration, in the following examples.

EXAMPLE 1

Preparation of 1-Butene-Propylene Copolymer

Isobutane, 1-butene (99 wt. % minimum purity), and propylene (99.9 wt. % minimum purity) were separately fed as liquids under helium pressure to a stirred mixing tank (working capacity=150 lbs.) to form a liquefied pre-reaction feed mixture having the following composition, based on the total weight of the mixture including diluents, as determined by the amounts of each component fed to the stirred mixing tank from the appropriate reservoirs: propylene, 4.6 wt. %; isobutane, 60.9 wt. %; and 1-butene, 34.5 wt. %. The liquefied pre-reaction mixture was then continuously passed using pressurized helium through a first set of treatment beds containing activated alumina and a second set of treatment beds containing 3A molecular sieves to remove traces of moisture and the polar components from the pre-reaction mixture. The pre-reaction mixture was then continuously fed into the bottom of a temperature-controlled, baffled, 1.2-liter stirred reactor. Reactor residence time was set by the feed rate to breed rate to be 30 minutes. Reactior pressure was maintained at 1700 kPa gauge. Reaction temperature was set at 60° C.

At the same time, a solution of racemic dimethylsilanyl-bridged bis(4,5,6,7-tetrahydroindenyl) ZrCl$_2$ catalyst and methylaluminoxane cocatalyst was separately and continuously fed to the reactor. Catalyst concentration in the reactor was set at 2.84×10$^{-5}$ gram-mole/liter by manipulation of the catalyst solution feed rate in conjunction with the pre-reaction mixture feed rate. The Al:Zr molar ratio was 1150:1. The catalyst-cocatalyst solution had been earlier prepared under nitrogen by adding racemic 1,1-dimethylsilanyl-bridged bis(4,5,6,7-tetrahydroindenyl) zirconium dichloride catalyst dissolved in toluene to a 10 wt. % solution of methylaluminoxane (MAO; molecular weight=1000; aluminum content=5.93 mole %) in toluene, followed by addition of further toluene to obtain the final solution. All toluene employed was molecular-sieve-dried.

The product stream was continuously removed from the top of the reactor, quenched with a dilute aqueous solution of caustic, scrubbed with water to remove the caustic, passed through a heat exchanger to heat the stream, and flashed by venting to atmospheric pressure to remove unreacted monomer and n-butane from the polymer product.

The resulting polymer was found to have a $\overline{M}_n$ of 2,880 and a molecular weight distribution of 1.68, as determined by gel permeation chromatography using a PIB standard. The propylene content of the polymer was 20 mole % as determined by carbon-13 NMR.

EXAMPLE 2

Preparation of a Polyamine Dispersant

In a Parr autoclave, 200 grams of the 1-butene-propylene copolymer prepared in Example 1 was reacted with 8.4 grams of maleic anhydride for 4 hours at 250° C. The excess maleic anhydride was stripped with nitrogen at 220° C. for 1 hour to yield a 1-butene-propylene succinic anhydride (BPSA) with a saponification number of 32.7. Then 140 grams of the BPSA was dissolved in 113.6 grams of S150N mineral lubricating base oil forming a solution. 4.7 grams of a commercial polyamine was added dropwise to the oil solution of BPSA at 149° C. over a period of 25 minutes. The polyamine (PAM) comprised a polyethylene polyamine having an average of about 6 nitrogen atoms and an average of about 10 carbon atoms per molecule. The solution was then stripped with nitrogen at 160° C. for 60 minutes, to yield a dispersant solution containing 0.62 wt. % N.

EXAMPLE 3

Viscometric Measurements

Figure 2:
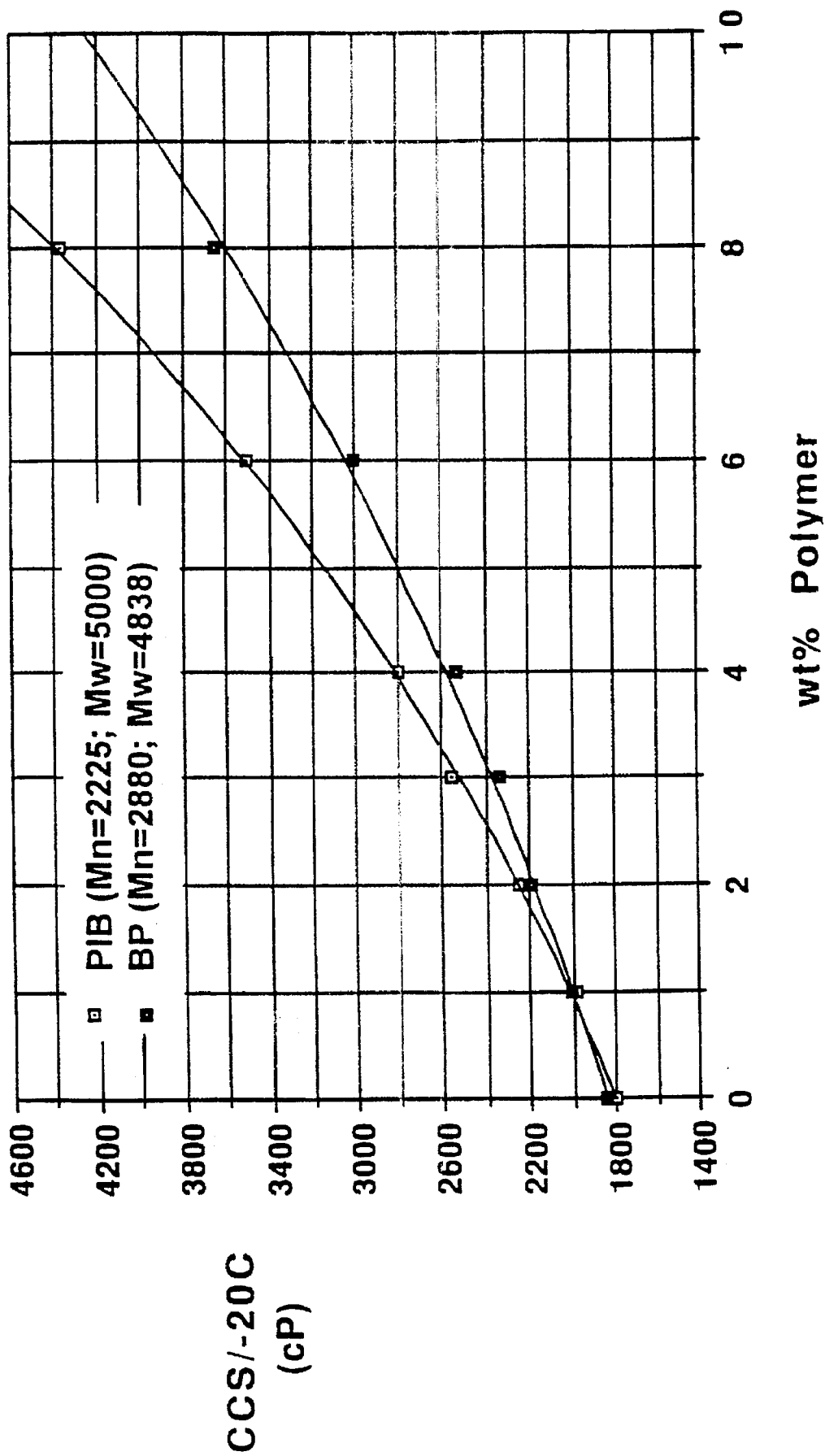
FIG. 2 is a plot of the CCS viscosities of S150N mineral oil solutions of the 1-butene-propylene copolymer of Example 1 and of a polyisobutylene of $\overline{M}_n$=2,225 versus solution concentration.

Polymer. S150N mineral oil solutions of the 1-butene-propylene copolymer prepared in Example 1 were prepared at several concentrations in the range of from 1 to 8 wt. %. Analogous solutions of a polyisobutylene ($\overline{M}_n$=2,225; $\overline{M}_w$=5,000) were also prepared. The kinematic viscosities of the solutions were measured in centistokes at 100° C. using ASTM Method No. D445, and the results plotted as a function of solution concentration, as shown in FIG. 1. Similarly, the CCS viscosities of the solutions were measured in centipoise at −20° C. using ASTM Method No. D2602, and plotted as shown in FIG. 2. The kinematic and CCS viscosities of the 1-butene-propylene copolymer solutions were lower than those for the polyisobutylene at the same concentration, even though the degree of polymerization of the 1-butene-propylene copolymer was significantly higher than that of the polyisobutylene.

Figure 3:
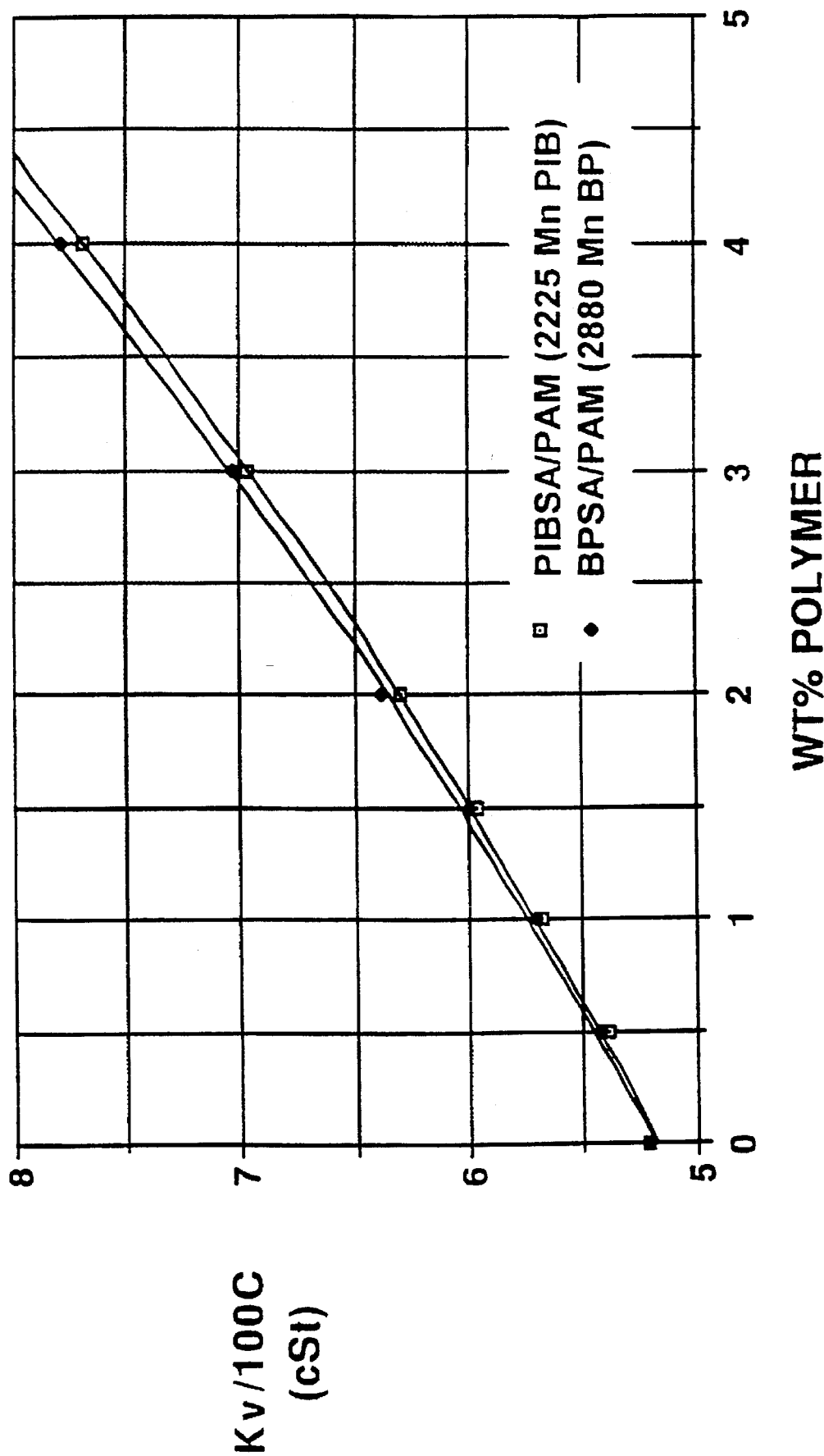
FIG. 3 is a plot of the kinematic viscosities of S150N mineral oil solutions of the BPSA/PAM dispersant of Example 2 and of a PIBSA/PAM dispersant versus solution concentration.
Figure 4:
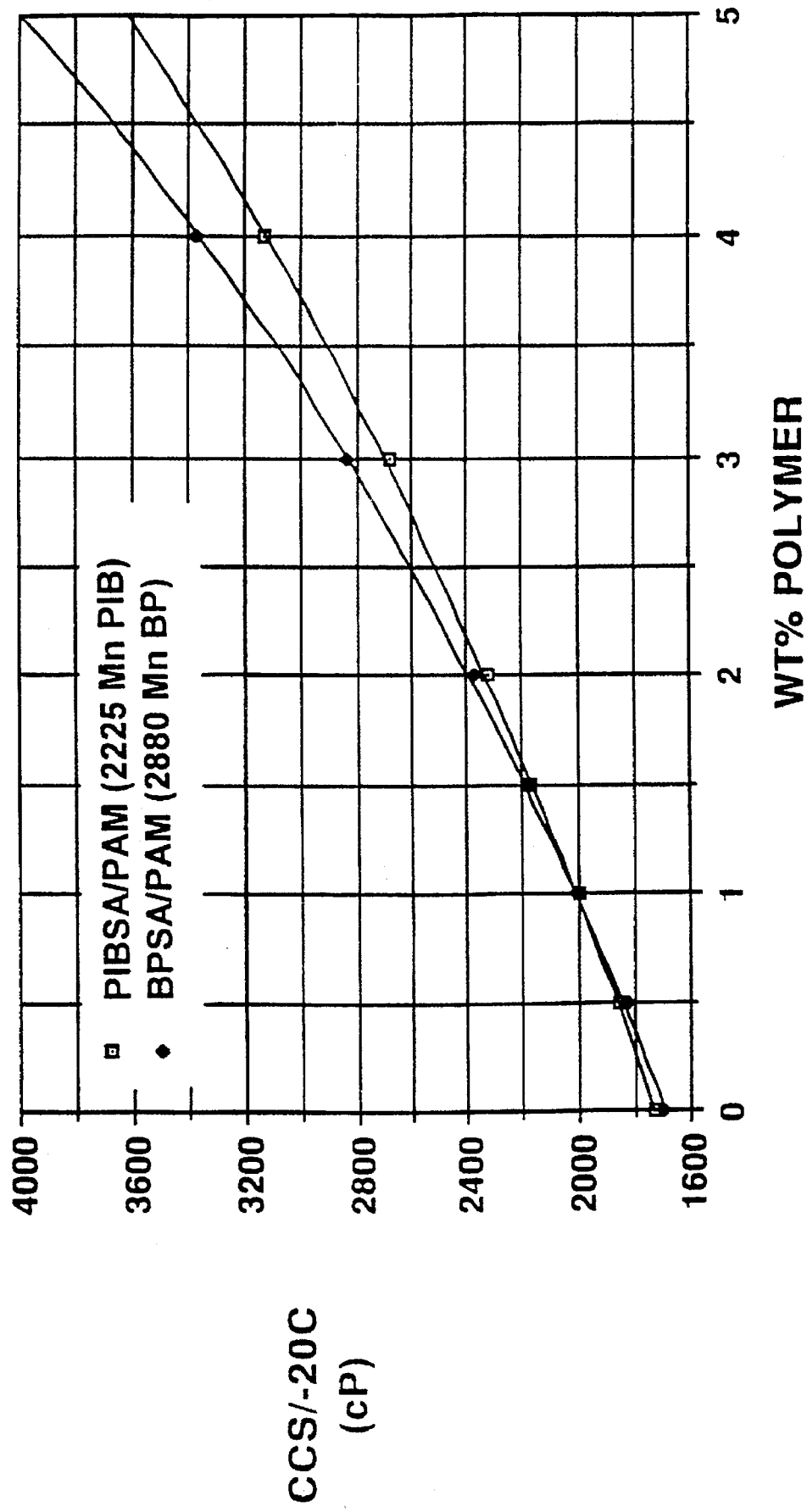
FIG. 4 is a plot of the CCS viscosities of S150N mineral oil solutions of the BPSA/PAM dispersant of Example 2 and of a PIBSA/PAM dispersant versus solution concentration.

Dispersant. S150N mineral oil solutions of the BPSA-PAM dispersant prepared in Example 2 were prepared at several concentrations over the range from 0.5 to 4 wt. %. Analogous solutions were also prepared of a commercially available PIBSA-PAM dispersant prepared by the low temperature maleination of a chlorinated polyisobutylene ($\overline{M}_n$=2,225; $\overline{M}_w$=5,000), followed by amination with a polyamine comprising a polyethylene polyamine having an average of about 6 nitrogen atoms and an average of about 10 carbon atoms per molecule, wherein the process lowers the number average molecular weight of the polyisobutylene backbone by about 10–20%. The kinematic and CCS viscosities of the solutions were measured as described in the preceding paragraph and plotted as functions of concentration, as shown in FIGS. 3 and 4 respectively. The viscometric properties of the BPSA-PAM and the PIBSA-PAM were quite similar despite the significant difference in the molecular weight of the polymer backbones.

EXAMPLE 4

SIB/VIB Test

The performance properties of the BPSA-PAM dispersant prepared in Example 2 were compared to those of the borated PIBSA-PAM dispersant described in Example 3, by testing lubricating oil compositions containing the dispersants for sludge inhibition via the SIB test and for varnish inhibition via the VIB test. In the SIB test, a dispersant is added to a clear, bright supernatant oil obtained from a used crankcase oil composition that has been used in a taxicab.

The used crankcase oil contains a base mineral lubricating oil, a viscosity modifier, a pour point depressant and a zinc dialkyldithiophosphate anti-wear additive, but itself has no dispersant additive. This supernatant oil has been separated from the oil insoluble sludge deposits which formed in the crankcase oil during use, but it still contains oil-soluble sludge precursors which on heating under the conditions of the SIB test tend to form additional oil-insoluble deposits. The sludge inhibition of the dispersant is then determined by heating the dispersant-oil blend in air for several hours and comparing the amount of sludge (in mg) formed in the blend to the amount formed by a similarly treated blank containing only the oil. SIB values are reported on a normalized scale of 1 (high inhibition) to 11 (no inhibition).

In the VIB test, a dispersant is admixed with the same test oil as used in the SIB test. The oil is then subjected to one or more test cycles that include heat soaking, heat cycling, and exposure to NO, $SO_2$, and water. Varnish inhibition is determined by visual inspection of the wall surfaces of the test flasks and comparison to a blank with no additive. VIB values are reported on a scale of 1 (high inhibition) to 11 (no inhibition).

A more detailed description of the SIB and VIB tests can be found in U.S. Pat. No. 4,954,572, the disclosure of which is incorporated by reference.

At equivalent active ingredients, the BPSA-PAM had a SIB value=1.37 and VIB=4, whereas the borated PIBSA-PAM had 4.26 SIB and 5 VIB. The results demonstrate that, at equivalent viscometrics, the BPSA-PAM dispersant has performance advantages over the PIB-based dispersant.

What is claimed is:

1. An oil-soluble dispersant additive comprising the reaction product of:
    (a) a copolymer functionalized to have within its structure at least one acyl functional group selected from the group consisting of $C_4$ to $C_{10}$ dicarboxylic acids and derivatives thereof and $C_3$ to $C_{10}$ monocarboxylic acids and derivatives thereof, the copolymer comprising units derived from 1-butene and at least one other α-olefin of formula $CH_2=CHR'$, wherein R' is methyl or a $C_3$ to $C_{12}$ linear or branched alkyl group, the copolymer having a number average molecular weight of from about 700 to 10,000, a molecular weight distribution of less than about 5, and ethenylidene groups terminating at least about 30% of all polymer chains; and
    (b) at least one derivatizing compound comprising a nucleophilic reactant selected from the group consisting of amines, amino alcohols, alcohols, reactive metal compounds and mixtures thereof.

2. The dispersant additive of claim 1, wherein the acyl functional group is derived from at least one monounsaturated carboxylic reactant selected from the group consisting of (i) monounsaturated $C_4$ to $C_{10}$ dicarboxylic acids wherein (a) the carboxyl groups are attached to adjacent carbon atoms and (b) at least one of the adjacent carbon atoms is part of the monounsaturation; (ii) anhydride or $C_1$ to $C_5$ alcohol derived mono- or diester derivatives of (i); (iii) monounsaturated $C_3$ to $C_{10}$ monocarboxylic acids wherein the carbon-carbon double bond is allylic to the carboxy group; and (iv) $C_1$ to $C_5$ alcohol derived monoesters of (iii).

3. The dispersant additive of claim 2, wherein the nucleophilic reactant is an amine containing from about 2 to 60 carbon atoms and from about 1 to 12 nitrogen atoms per molecule.

4. The dispersant additive of claim 3, wherein the amine comprises polyethylenepolyamine and wherein the acyl functional group is at least one member selected from the group consisting of succinic anhydride, succinic acid, and propionic acid.

5. The dispersant additive of claim 1, wherein the copolymer has an isotactic index of at least about 70%.

6. The dispersant additive of claim 1, wherein the additive is post-treated with a borating agent to obtain a borated dispersant additive containing from about 0.05 to 2.0 weight percent boron.

7. The dispersant additive of claim 1, wherein the α-olefin comprises propylene.

8. A lubricating oil composition containing from about 0.1 to 20 wt. % of the dispersant additive product of any one of claims 1, 6, or 7.

9. The dispersant additive of claim 1, wherein the number average molecular weight of the copolymer is from about 1,000 to 5,000.

10. The dispersant additive of claim 9, wherein ethenylidene groups terminate at least 70% of all polymer chains.

11. The dispersant additive of claim 9, wherein the copolymer comprises at least about 5 mole % units derived from α-olefin.

12. A lubricating oil concentrate containing from about 10 to 80 wt. % of the dispersant additive product of any one of claims 1, 6, or 7.

13. The dispersant additive of claim 7, wherein the copolymer comprises from about 5 mole % to 40 mole % units derived from propylene.

14. The dispersant additive of claim 13, wherein the copolymer has an isotactic index of at least about 70%.

15. The dispersant additive of claim 14, wherein the nucleophilic reactant comprises polyethylenepolyamine.

16. The dispersant additive of claim 5, wherein the number average molecular weight oft he copolymer is from about 1,000 to 5.000.

17. An oil-soluble dispersant additive comprising the reaction product of:
    (a) a copolymer of 1-butene functionalized to have within its structure at least one acyl functional group selected from the group consisting of $C_4$ to $C_{10}$ dicarboxylic acids and derivatives thereof and $C_3$ to $C_{10}$ monocarboxylic acids and derivatives thereof, the copolymer having a number average molecular weight of from about 700 to 10,000 and containing units derived from propylene polymerized into the polymer chain, at least 70% of the polymer chains in the copolymer having a terminal vinylidene group; and
    (b) at least one derivatizing compound comprising a nucleophilic reactant selected from the group consisting of amines, amino alcohols, alcohols, reactive metal compounds and mixtures thereof.

* * * * *